(12) United States Patent
Crevasse et al.

(10) Patent No.: US 6,462,305 B1
(45) Date of Patent: Oct. 8, 2002

(54) METHOD OF MANUFACTURING A POLISHING PAD USING A BEAM

(75) Inventors: Annette M. Crevasse; William G. Easter; Frank Miceli, all of Orlando, FL (US)

(73) Assignee: Agere Systems Inc., Murray Hill, NJ (US)

( * ) Notice: Subject to any disclaimer, the term of this patent is extended or adjusted under 35 U.S.C. 154(b) by 9 days.

(21) Appl. No.: 09/785,636

(22) Filed: Feb. 16, 2001

(51) Int. Cl.[7] .............................................. B23K 26/38
(52) U.S. Cl. .................................................. 219/121.72
(58) Field of Search ........................ 219/121.6, 121.67, 219/121.68, 121.69, 121.72, 121.85

(56) References Cited

U.S. PATENT DOCUMENTS 5,373,135 A * 12/1994 Beyer et al. ............ 219/121.67
5,538,465 A *  7/1996 Netsu et al. ................. 451/397
6,004,363 A * 12/1999 Pisacane et al. ............... 51/297

FOREIGN PATENT DOCUMENTS

JP            03147815 A   *  6/1991   ............ 219/121.67

* cited by examiner

Primary Examiner—Samuel M. Heinrich

(57) ABSTRACT

The present invention provides a method of manufacturing a polishing pad using a beam, and a system incorporating the method. In one embodiment, the method includes providing a cake that is susceptible to beam ablation, and skiving a polishing pad from the cake using a beam apparatus configured to produce a beam.

23 Claims, 1 Drawing Sheet

METHOD OF MANUFACTURING A POLISHING PAD USING A BEAM

TECHNICAL FIELD OF THE INVENTION

The present invention is directed, in general, to polishing pads and, more specifically, to a method of manufacturing a polishing pad using a focused beam.

BACKGROUND OF THE INVENTION

In the fabrication of semiconductor components, the various devices are formed in layers upon an underlying substrate, such as silicon. In such semiconductor components, it is desirable that all layers, including insulating layers, have a smooth surface topography, since it is difficult to lithographically image and pattern layers applied to nonuniform surfaces. To this end, conventional chemical/mechanical polishing (CMP) has been developed for providing planar semiconductor topographies. Typically, a given semiconductor wafer may be planarized several times, such as upon completion of each metal layer.

The CMP process involves holding, and optionally rotating, a thin, reasonably flat, semiconductor wafer against a rotating polishing pad. The wafer may be repositioned radially within a set range as the polishing pad is rotated across the surface of the wafer. The polishing surface, which conventionally includes a polyurethane material affixed to a platen, is wetted by a chemical slurry, under controlled chemical, pressure, and temperature conditions. The chemical slurry contains selected chemicals which etch or oxidize selected surfaces of the wafer during the CMP process in preparation for their removal.

The more uniformly the chemical and mechanical agents remove the material during the polishing process, the better planarization of the polished surface of the semiconductor wafer. However, in this process it is important to remove a sufficient amount of material to provide a planar surface, without removing an excessive amount of underlying materials. As a result, uniform material removal is particularly important in today's submicron technologies where the layers between device and metal levels are constantly getting thinner.

Because of the importance of the uniform removal of material, the manufacture of semiconductor wafer polishing pads has become a critical part of the overall manufacturing process. Conventional polishing pads for use in the CMP process are typically formed by adhering a polyurethane polishing surface, or other suitable polymer material, to a foam or felt pad impregnated with the same or similar polymer material. However, before the gluing may take place, an initial step in the manufacture of such polishing pads is cutting the polishing pad from a large cylinder, called a "cake," composed of that material. This step of the manufacturing process is typically referred to as "skiving." Unfortunately, conventional techniques used to skive the polishing pad from the cake are believed to be problematic.

Accordingly, what is needed in the art is a method of manufacturing a polishing pad that does not suffer from the numerous deficiencies of the methods found in the prior art.

SUMMARY OF THE INVENTION

To address the above-discussed deficiencies of the prior art, the present invention provides a method of manufacturing a semiconductor wafer polishing pad using a beam, and a system incorporating the method. In one embodiment, the method includes providing a cake that is susceptible to beam ablation, and skiving a polishing pad from the cake using the beam. In an advantageous embodiment, the cake is comprised of polyurethane.

In exemplary embodiments of the present invention the beam may be a laser, for example an excimer laser, and may be pulsed along the cutting line where the cake will be skived. In these embodiments, the beam may have an intensity of about 400 mJ, a wavelength ranging from about 193 nm to about 308 nm, and a frequency ranging from about 250 Hz to about 800 Hz. In addition, if the beam is pulsed, the duration of each pulse ranges from about 10 ns to about 50 ns.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following description taken in conjunction with the accompanying drawing, in which.

DETAILED DESCRIPTION

Figure 1:
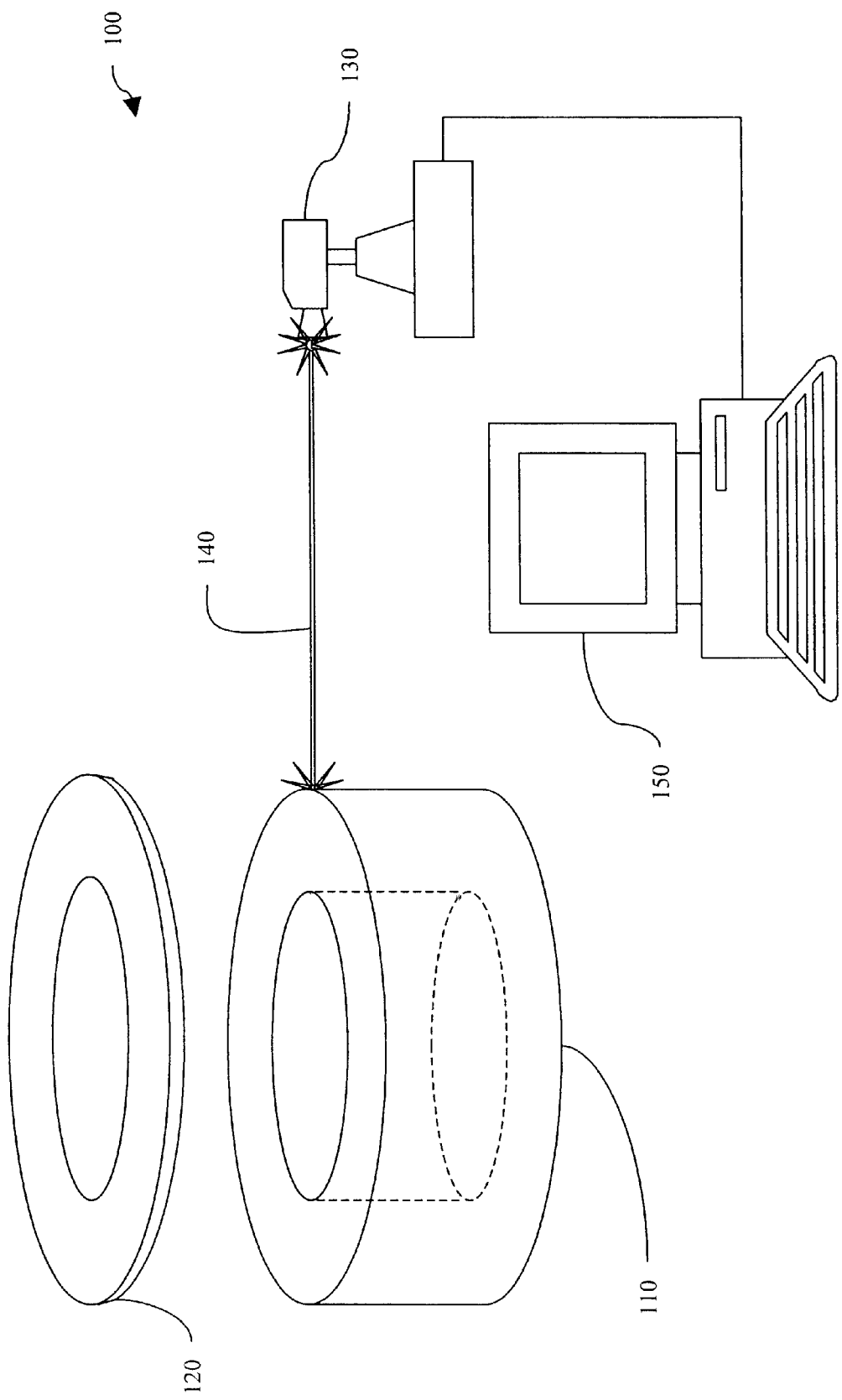
FIG. 1 illustrates a system for skiving a polishing pad using a beam, such as that generated from a beam apparatus, according to the principles of the present invention.

Most conventional techniques require skiving the polishing pad from the cake with a large, optionally rotated, metal blade. It has been recently discovered, however, that skiving with such a blade negatively impacts the physical characteristics of the pad removed from the cake and used to form the polishing surface of the polishing pad. It is believed that the primary physical characteristic is the change in the viscoelastic properties of the polyurethane across its diameter and throughout its thickness.

Ultrasonic mapping of the type described in co-pending patent application Ser. No. 09/340,779, filed Jun. 28, 1999 and entitled "Non-Destructive System And Method For Measuring Bond Completion On Urethane Polishing Pads," has been used to reveal this nonuniformity. Through such mapping, the nonuniform density of the polyurethane is revealed to be a bulk phenomenon, and the distortion is not simply limited to the surface of the polishing pad. The details of performing such an ultrasonic mapping technique are described in the aforementioned application, which is commonly assigned with the present invention and is incorporated herein by reference in its entirety.

It is believed that among the causes of this nonuniformity is the mechanical distortion of the polyurethane caused by the pressure of the blade during the skiving process. It is further hypothesized that the thermal distortion caused by the heat generated from the friction between the blade and the cake causes further nonuniformity in the physical characteristics of the polishing pads. In addition to nonuniformity, device damaging defects are generated. Moreover, the damage to the polishing surface is believed to be exacerbated when the polymer material comprising the cake is particularly soft or heat sensitive. In addition, as metal blades dull, these disadvantages become even more prominent until the blade is replaced, often at significant cost.

The combination of these disadvantages typically results in a costly skiving process that produces a polishing pad having nonuniform physical characteristics across the diameter of the polishing pad. Consequently, without uniform physical properties across the entire polishing pad, and throughout its thickness, the uniformity, as well as the overall quality, of the polishing performed on semiconductor wafers is also lost. In turn, such loss of uniformity in polishing is routinely the source of defects found on the surface of wafers. As device size continues to shrink, defect reduction becomes critical to maintain quality. With the intense competition in today's semiconductor industry, and the high cost of semiconductor materials, manufacturers are understandably eager to reduce or eliminate the production of defective wafers.

In light of these newly recognized problems, the present invention, in an exemplary embodiment, as illustrated in FIG. 1, provides a system 100 for skiving a polishing pad using a beam. The system 100 includes a cake 110 from which semiconductor wafer polishing pads are skived.

In an exemplary embodiment, the cake 110 is comprised of conventional materials, such as a polymer, and in an advantageous embodiment, is comprised of polyurethane. Those skilled in the art understand the advantages of forming semiconductor wafer polishing pads from polyurethane, as well as the benefits of using polyurethane polishing pads to polish semiconductor wafers. A polyurethane polishing pad 120, which has been skived from the cake 110, is also illustrated in FIG. 1.

The system 100 further includes a beam apparatus 130. The beam apparatus 130 is used to generate a beam 140, which is directed towards the cake 110. The beam 140 is used to skive the cake 110 in accordance with the principles of the present invention. The use of a beam on a polymer material is discussed at length in co-pending patent application Ser. No. 09/686,028, filed Oct. 10, 2000, and entitled "A Method of Manufacturing a Slurry Distribution System on a Semiconductor Wafer Polishing Pad," which is commonly assigned with the present invention and is also incorporated by reference herein in its entirety.

In advantageous embodiments, the beam apparatus 130 may be any device capable of producing a beam capable of cutting, such as a focused beam, examples of which includes a laser or a focused ion beam apparatus. Other beams that may be generated to skive the cake 110 include an energy beam, or a particle beam. In an advantageous embodiment, a laser is used that generates a focused laser beam that falls within the laser spectrum. The laser spectrum as used herein includes frequencies between about $1.00 \times 10^2$ Hz and about $1.00 \times 10^{15}$ Hz. In a particularly advantageous embodiment, the beam apparatus 130 is an excimer laser generator. Additionally, depending on the gas supplied to the beam apparatus, if any, radiation may be obtained on varying wavelengths. (See Table 1)

TABLE 1

| Gas | Wavelength |
| --- | --- |
| XeF | 351 nm |
| XeCl | 308 nm |
| KrF | 248 nm |

TABLE 1-continued

| Gas | Wavelength |
| --- | --- |
| ArF | 193 nm |
| $F_2$ | 157 nm |

In order to skive the polishing pad 120 from the cake 110, the beam 140 is projected against the cake 110. Once in contact with the cake 110, the beam 140 is used to cut through the material comprising the cake 110. It must be noted that the present invention is not limited to a single beam 140. In other embodiments, the cake 110 may be skived by multiple beams produced from the single beam apparatus 130 illustrated in FIG. 1 using beam splitters, or even generated from more than one beam apparatus 130.

When the beam 140 is focused and concentrated onto the cake 110, thermal energy generated by the beam apparatus 130 and carried by the beam 140 cuts, or skives, the material of the cake 110 at a desired location. By ablating the cake 110 material with a narrowly beam 140, rather than cutting the material using the crude mechanical methods found in the prior art, semiconductor wafer polishing pads are created with greater speed and precision. Moreover, it is believed that mechanical and thermal distortion of the polyurethane caused by the pressure of the blade during the skiving process is substantially reduced with the use of the pulsed, beam apparatus. This is so since organic polymers have poor thermal conductivity and strong absorption at these wavelengths.

The beam 140 may also be pulsed against the cake 110 during the skiving process. In a more specific embodiment, the beam 140 is pulsed for a period of time ranging from about 10 ns to about 50 ns. In an advantageous embodiment, by pulsing the beam 140 for a duration less than 50 ns most of the thermal energy carried by the beam 140 is carried off by the polymer material ejected during the ablation of the cake 110. More precisely, the polymer material of the cake 110 is heated during the pulse duration of the beam apparatus 130, which is set to a particular intensity, so as to sublimate the polymer material. By dissipating most of the thermal energy along with the ejected material in this manner, little or no thermal damage to the remaining cake 110 material occurs. Those skilled in the art recognize one embodiment of this method of operating a beam apparatus to cut material as "pulsed laser evaporation," a form of ablation, and is commonly employed in other fields of micro-machining.

The further dissipate thermal energy, the beam 140 may also be focused on varying locations of the cake 110, all along the line of cutting. Specifically, in an exemplary embodiment of the present invention, a conventional computer system 150 conventionally programmed with the varying pattern may be employed to maneuver the beam 140 to different locations along the line of cutting in any of a number of desired movements. In an alternative embodiment, the computer system 150 may move the cake 110 itself while holding the beam 140 in a stationary position, or may even maneuver both the beam 140 and the cake 110 simultaneously during the skiving process. In a further embodiment, mirrors may be employed to redirect the beam 140 across the cutting line on the cake 110. Of course, such maneuvering may also be accomplished manually, rather than with the assistance of the computer system 150. Regardless of the method used, it should be understood that such maneuvering of the beam 140 along the cutting line allows the polishing pad 120 to be skived from the cake 110 without concentrating a great deal of thermal energy in a single location for an extended period of time.

In another exemplary embodiment, the beam 140 used to skive the polishing pad 120 has a frequency ranging from about 250 Hz to about 800 Hz. In an advantageous embodiment, the beam 140 has a specific frequency of about 300 Hz. It has been found that operating the beam apparatus 130 at about 300 Hz, such as with an excimer laser, is most advantageous when skiving semiconductor wafer polishing pads comprised of polyurethane. Of course, other frequencies are well within the broad scope of the present invention.

The beam apparatus 130 in this advantageous embodiment is also operated at an intensity of about 400 mJ/cm$^2$. By focusing the beam 140 on the cake 110 with an intensity of about 400 mJ/cm$^2$, the polishing pad 120 may be skived with high efficiency. Moreover, efficiency may be maximized by applying the beam 140 with the minimum intensity necessary to skive the polishing pad 120, so that the least amount of damaging thermal energy is generated by the beam apparatus 130. By operating the beam apparatus 130 at this advantageous point, thermal damage to the material remaining on the cake 110 is curtailed or eliminated. When combined with one of the maneuvering technique described above, the possibility of thermal damage to the remaining material on the cake 110 is even further minimized. Moreover, with the use of a beam, such as a excimer laser beam, polishing pads having substantially uniform physical characteristics throughout may be consistently manufactured with greater ease and less expense due to the pulse-to-pulse energy stability, as well as the wavelength stability and reproducibility, achievable with laser beams. In addition, a XeCl excimer laser has the advantage of using HCl gas rather than the $F_2$ gas required for a KrF (308 nm) laser in a manufacturing environment.

Similarly, the beam apparatus 130 may be operated to generate a beam 140 within the ultraviolet wavelength, for example, ranging from about 248 nm to about 308 nm. In an exemplary embodiment, the beam 140 has a wavelength of about 248 nm, which results in the removal (and sublimation) of only about 1000 nm of polymer material from the cake 110 during one pulse. By removing such small amounts of material at a time, in addition to the sublimate effect discussed above, the thermal damage caused to the remaining material is even further curtailed, resulting in the manufacture of a more precise and uniform polishing pad 120.

The computer system 150 discussed above is coupled to the beam apparatus 130 in order to regulate the parameters of the beam 140 mentioned above. With the computer system 150, the numerous parameters of the beam 140 may be established such that the polishing pad 120 may be skived from the cake 110 with little or no variation in physical characteristics. By producing a polishing pad 120 having substantially uniform physical characteristics across its entire diameter, as well as throughout its thickness, the polishing of semiconductor wafers becomes much more precise than with polishing pads manufactured using techniques found in the prior art. This uniformity may be seen by performing ultrasonic mapping of the polishing pads skived in accordance with the present invention, in accordance with the technique described above.

In addition, a feedback sensor (not illustrated) may also be coupled to the computer system 150 in order to send information regarding those physical characteristics to the computer system 150 during the skiving process. In response to such information from the feedback sensor, the computer system 150 may then alter the settings of the beam apparatus 130, and thus the parameters of the beam 140 generated therefrom. Thus, whether the physical characteristics of the polishing pad 120 are uniform may be monitored, and if necessary corrected, throughout the skiving process. In addition, this level of precision may be repeated from one polishing pad to the next, with little or no variation between them.

In conclusion, a method and system have been described that uses a beam apparatus generating a beam to skive a cake in order to manufacture semiconductor wafer polishing pads. By employing a beam to skive the cake, the present invention overcomes the disadvantages found in the prior art methods. Specifically, inaccuracies between new and used blades is eliminated, since a beam, such as a pulsed excimer laser beam, produces higher accuracy and precision. Additionally, thermal damage to the areas surrounding the cutting line is reduced or eliminated by adjusting the intensity and duration of the beam, based on the material comprising the cake. With the proper adjustment of the beam, the thermal energy generated by the beam is dispersed along with the material ejected and sublimated during the skiving process. As a result, semiconductor wafer polishing pads having substantially uniform physical characteristics across their diameters may be manufactured quickly, accurately and repeatedly. Additionally, by conducting the skiving process with a computer system, the repeatability of these uniform physical characteristics from one polishing pad to the next may be assured, as evidenced through ultrasonic mapping of polishing pads manufactured using the system or method of the present invention.

Although the present invention has been described in detail, those skilled in the art should understand that they can make various changes, substitutions and alterations herein without departing from the spirit and scope of the invention in its broadest form.

What is claimed is:

1. A method of manufacturing a polishing pad, including:

providing a polishing pad cake susceptible to beam ablation; and skiving a polishing pad from the cake using a beam.

2. The method recited in claim 1 wherein providing a cake includes providing a cake comprising a polymer.

3. The method recited in claim 2 wherein providing a cake comprising a polymer includes providing a cake comprising polyurethane.

4. The method recited in claim 1 wherein skiving a polishing pad with a beam includes using a laser.

5. The method recited in claim 4 wherein using a laser includes pulsing the laser to skive the polishing pad.

6. The method recited in claim 5 wherein pulsing the laser includes pulsing for a period of time ranging from about 10 ns to about 50 ns.

7. The method recited in claim 1 wherein skiving a polishing pad using a beam includes skiving a polishing pad using a beam having a beam intensity of about 400 mJ.

8. The method recited in claim 1 wherein skiving a polishing pad using a beam includes skiving a polishing pad using a beam having a frequency ranging from about 250 Hz to about 800 Hz.

9. The method recited in claim 1 wherein skiving a polishing pad using a beam includes skiving a polishing pad using a beam having a wavelength ranging from about 193 nm to about 308 nm.

10. A system for manufacturing a polishing pad, comprising:

a cake susceptible to beam ablation; and a beam apparatus configured to produce a beam capable of skiving the cake to produce a polishing pad.

11. The system recited in claim 10 wherein the cake comprises a polymer.

12. The system recited in claim 11 wherein the cake comprises polyurethane.

13. The system recited in claim 10 wherein the beam apparatus is a laser generator, and the beam is a laser.

14. The system recited in claim 10 wherein the beam apparatus is configured to be pulsed.

15. The system recited in claim 14 wherein the beam apparatus is configured to pulse for a period of time ranging from about 10 ns to about 50 ns.

16. The system recited in claim 10 wherein the beam apparatus is configured to produce a beam having a beam intensity of 400 mJ.

17. The system recited in claim 10 wherein the beam apparatus is configured to produce a beam having a frequency ranging from about 250 Hz to about 800 Hz.

18. The system recited in claim 10 wherein the beam apparatus is configured to produce a beam having a wavelength ranging from about 193 nm to about 308 nm.

19. A method of manufacturing an integrated circuit, comprising:

forming devices on a semiconductor wafer;

polishing a material deposited over the devices with a polishing pad skived from a cake using a beam; and interconnecting the devices to form an operative integrated circuit.

20. The method recited in claim 19 further including providing a polishing pad skived from a polymer cake.

21. The method recited in claim 1 wherein polishing includes polishing with a polishing pad skived from a cake using a laser.

22. The method recited in claim 21 wherein polishing with a polishing pad skived from a cake includes polishing with a polishing pad skived using a laser pulsed for a period of time ranging from about 10 ns to 50 ns and at an intensity of about 400 mJ, and at a frequency ranging from about 250 Hz to about 800 Hz.

23. The method recited in claim 1 wherein forming devices includes forming devices wherein the devices are transistors, inductors, resistors, capacitors, optical devices or optoelectronic devices.

* * * * *